(12) United States Patent
Gupta

(10) Patent No.: US 7,148,287 B2
(45) Date of Patent: *Dec. 12, 2006

(54) WATER CURABLE POLYURETHANE COMPOSITIONS WITH IMPROVED VISCOSITY CHARACTERISTICS

(76) Inventor: Laxmi C. Gupta, 2852 Mainway Dr., Los Alamitos, CA (US) 90720

( * ) Notice: Subject to any disclaimer, the term of this patent is extended or adjusted under 35 U.S.C. 154(b) by 0 days.

This patent is subject to a terminal disclaimer.

(21) Appl. No.: 10/844,957

(22) Filed: May 13, 2004

(65) Prior Publication Data

US 2005/0027093 A1    Feb. 3, 2005

Related U.S. Application Data

(60) Provisional application No. 60/470,810, filed on May 15, 2003.

(51) Int. Cl.
C08G 18/10    (2006.01)

(52) U.S. Cl. .......................... 524/871; 528/59
(58) Field of Classification Search ................ 528/59; 524/871
See application file for complete search history.

(56) References Cited

U.S. PATENT DOCUMENTS

| | | | |
|---|---|---|---|
| 3,975,316 A * | 8/1976 | Villa ........................ | 521/101 |
| 4,038,239 A * | 7/1977 | Coyner et al. .............. | 524/872 |
| 4,345,058 A | 8/1982 | Dettling | |
| 4,426,488 A | 1/1984 | Wyman | |
| 4,532,316 A | 7/1985 | Henn | |
| 5,128,433 A | 7/1992 | LeCompte et al. | |
| 5,288,797 A | 2/1994 | Khalil et al. | |
| 5,415,499 A | 5/1995 | Hyde-Smith et al. | |
| 5,455,294 A | 10/1995 | Sheng | |
| 5,459,185 A | 10/1995 | Nakata et al. | |
| 5,464,921 A | 11/1995 | Laas et al. | |
| 5,530,085 A | 6/1996 | Giorgini | |
| 5,536,805 A | 7/1996 | Kangas | |
| 5,559,196 A | 9/1996 | Stobbie, IV et al. | |
| 5,574,114 A | 11/1996 | Stobbie, IV et al. | |
| 5,603,798 A | 2/1997 | Bhat | |
| 5,614,575 A | 3/1997 | Kotschwar | |
| 5,643,983 A | 7/1997 | Lee | |
| 5,672,652 A | 9/1997 | Bhat | |
| 5,723,534 A | 3/1998 | Murray | |
| 5,747,627 A | 5/1998 | Kimura et al. | |
| 5,777,014 A | 7/1998 | Hopper et al. | |
| 5,852,103 A | 12/1998 | Bhat | |
| 5,962,618 A | 10/1999 | Primeaux, II et al. | |
| 5,965,662 A * | 10/1999 | Krebs et al. ................ | 524/590 |
| 5,994,493 A | 11/1999 | Krebs | |
| 6,133,395 A | 10/2000 | Miyata et al. | |
| 6,133,398 A | 10/2000 | Bhat et al. | |
| 6,262,217 B1 | 7/2001 | Tallmadge et al. | |
| 6,274,674 B1 | 8/2001 | Chang et al. | |
| 6,303,731 B1 | 10/2001 | Carlson et al. | |
| 6,406,531 B1 | 6/2002 | Bui et al. | |
| 6,870,000 B1 | 3/2005 | Gupta | |
| 2005/0148678 A1 | 7/2005 | Gupta | |

FOREIGN PATENT DOCUMENTS

| | | |
|---|---|---|
| DE | 19945831 A1 | 3/2001 |
| EP | 0125008 | 3/1987 |
| EP | 0111694 | 7/1989 |

OTHER PUBLICATIONS

The C.P. Hall Company, Svoboda, R.D., "Polymeric Plasticizers for Higher Performance Flexible PVC," Journal of Vinyl Technology, Sep. 1991.
Krik-Othmer Encyclopedia of Chemical Technology, 2d Edition, vol. 12, pp. 46-47 (1967).

* cited by examiner

*Primary Examiner*—Rachel Gorr
(74) *Attorney, Agent, or Firm*—Kagan Binder, PLLC

(57) ABSTRACT

Compositions incorporating water-curable urethane constituent(s) are formulated with favorable viscosity and viscosity stability characteristics, while at the same time, preserving desired hardness characteristics. The present invention is particularly useful in applications in which water-curable compositions include NCO-functional resins having relatively high NCO content and/or incorporate MDI-based constituents. Preferred modes of practicing the invention include implementing one or more formulation strategies to help retain hardness while preserving good viscosity characteristics. These preferred strategies involve (i) balancing scavenger, polyisocyanate and polyfunctional polyol content of the compositions or resins thereof, as the case may be, (ii) formulating an NCO-functional resin with chain extender constituent(s) to enhance viscosity stability, (iii) formulating with one or more plasticizers that enhance viscosity performance, and (iv) combinations of two or more of these strategies.

14 Claims, No Drawings

WATER CURABLE POLYURETHANE COMPOSITIONS WITH IMPROVED VISCOSITY CHARACTERISTICS

CROSS-REFERENCE TO RELATED APPLICATIONS

The present non-provisional Application claims the benefit of commonly owned provisional Application having Ser. No. 60/470,810, filed on May 15, 2003, and entitled WATER CURABLE POLYURETHANE COMPOSITIONS WITH IMPROVED VISCOSITY CHARACTERISTICS, which Application is incorporated herein by reference in its entirety.

FIELD OF THE INVENTION

The present invention relates to fluid compositions of the type that incorporate isocyanate-functional resins. More particularly, the present invention relates to water curable polyurethane compositions, also referred to as water-induced urethane compositions.

BACKGROUND OF THE INVENTION

Water curable, polyurethane (or urethane) compositions are known. Desirably, these are storage stable but readily and controllably cure or otherwise solidify with the use of water-containing curing agent(s) that are reactive with isocyanate moieties of the resin. The water may be in the form of liquid water vapor, steam, and/or the like. It may also be in a latex, emulsion, dispersion, slurry, gel, or the like. The cured compositions are waterproof, chemically resistant, elastomeric, readily cure under a wide range of temperature conditions with minimal shrinkage or expansion due to foaming. The compositions may be used as glue and/or applied, coated, trowelled, poured, shaped, sprayed, injected, rolled, brushed, or otherwise used to form structures of any desired thickness, including coatings, membranes, skid-resistant surfaces, plugs, gaskets, caulking, crack fillers, seals, encapsulation, three dimensional structures, and the like.

Embodiments of water curable polyurethane compositions are commercially available. These have advantageously been used as base and/or top coatings over commercial and residential floors or other walkways, roofing, plumbing, piping, columns or other architectural items, zoo enclosures, decking in marine environments, exterior walkways, and the like. These products can be applied as thick or as thin as desired and will cure controllably and consistently throughout using water as a curing agent.

A typical water curing composition has at least two parts. The first part includes an isocyanate-functional resin (also referred to as a prepolymer) and one or more additives that facilitate the processability, shelf life, handling, and/or performance (before or after curing) of the composition. The second part incorporates the curing agent, which generally includes water. The water may be supplied as steam, ambient humidity, vapor, a solution, an emulsion, a dispersion, a latex, or the like. A large, stoichiometric excess of water may be used. For example, the commercial embodiments noted above may be cured in this manner. U.S. Pat. No. 4,426,488 also describes a water curable polyurethane composition that can be cured in this manner. At the time of use, the first part containing the resin and the second part containing the curing agent are caused and/or allowed to interact. While the composition still has fluid properties, it is sprayed, coated, brushed, trowelled, poured, squeegeed, injected, or otherwise used in the desired manner. Thereafter, the composition cures and solidifies in due course.

Conventional NCO functional resins used in these compositions are generally formed by reacting a polyol component with a stoichiometric excess of a polyisocyanate component. Due to its favorable reactivity and commercial availability, toluene diisocyanate (TDI) has been widely used as the predominant constituent of the polyisocyanate component. However, TDI has a high vapor pressure. The content of TDI incorporated into such resins generally must be restricted for safety and environmental reasons. Safety and environmental concerns arise due to the practical realities of manufacturing NCO functional resins from polyol(s) and a stoichiometric excess of polyisocyanate(s). When excess polyisocyanate component and a polyol component are reacted, there is a strong likelihood that there will be at least some leftover, unreacted isocyanate functional reactants. Any leftover reactants that are relatively volatile, such as TDI if present, will tend to outgas to some degree from the composition during use and perhaps even after curing if curing does not go to completion.

Because emissions of volatile organic compounds such as volatile isocyanates are closely regulated, precautions are taken with respect to conventional compositions such as those incorporating TDI. Firstly, to minimize the amount of leftover diisocyanate such as TDI that might remain, the amount of the monomer in the formulation is restricted. Further, the reaction between such monomer and the polyol component is carefully carried out as far to completion as practical. Secondly, at the time of use, the compositions are used with appropriate precautions until cured. The need to carry the reaction so far to completion tends to increase manufacturing costs. The need to limit the isocyanate content of a resin also tends to limit beneficial characteristics of the resin whose quality tends to increase as a function of increasing urethane/urea content.

Recently, water-curable compositions have been developed in which a relatively low vapor pressure, NCO-functional compounds are substituted for all or a portion of the more conventional TDI. For example, assignee's co-pending U.S. provisional application titled WATER CURABLE POLYURETHANE COMPOSITIONS AND USES THEREOF in the name of L. Gupta, filed Apr. 9, 2002, and having U.S. provisional application Ser. No. 60/371,253, incorporated herein by reference in its entirety, describes water curable compositions whose NCO-functional resin component(s) incorporate MDI-based compounds. The vapor pressure, and hence volatility, of these compounds is extremely low. The use of these compositions is very desirable in those applications in which emissions of volatile organic compounds are desirably reduced.

Water curing of the water-induced urethane compositions can occur through external or internal mechanisms, as desired. External curing relies upon moisture in the ambient to effect crosslinking of the isocyanate functional resin. External curing has limitations. Inasmuch as the temperature and ambient humidity are not easily controlled in all instances, external curing can be unpredictable and/or unreliable.

Additionally, it is difficult to form relatively thicker coatings or other structures because ambient moisture must be allowed to diffuse or otherwise migrate throughout the material for curing to take place.

In contrast to external curing, internal curing involves mixing a substantial stoichiometric excess of water and any other desired constituents of the curing agent with the first part at the time of use. As a consequence, the compositions will cure throughout regardless of the thickness of the material or the ambient humidity. Internal curing also ensures that a substantial stoichiometric excess of water is present during curing, which is desirable as a handling aid. Internal curing is reliable and consistent.

While the exact nature of the curing reaction(s) is not known with certainty, it is generally believed that the water reacts with the NCO functionality on the resin to form urea linkages. A by-product of this reaction is carbon dioxide, $CO_2$. If not appropriately controlled in some fashion, the evolution of the $CO_2$ can cause excessive foaming, blistering, deleterious bubble formation, or otherwise impair the quality of the resultant cured material. To help control foaming, $CO_2$ scavengers are used. These generally include one or more compounds that chemically and/or physically interact with the $CO_2$ and/or other aspects of the composition in some fashion so as to alleviate the degree of foaming that would otherwise occur.

Examples of $CO_2$ scavengers that are believed to chemically interact with the $CO_2$ include alkaline compounds such as magnesium oxide, magnesium hydroxide, calcium hydroxide, and calcium oxide.

Even when using one or more $CO_2$ scavengers, foaming may still be difficult to control. In particular, increasing the NCO content of the resin (which includes the NCO functionality of not just the resin itself but also any unreacted monomer and/or reaction by-products, if any) tends to exacerbate foaming. Thus, although it is generally desirable in some circumstances to formulate with higher NCO content, doing so is not always practically feasible. It is thus more difficult to control foaming with increasing NCO content. Similarly, using NCO functional compounds that have greater rates of reaction with moisture also tend to exacerbate foaming. Thus, although it may be desirable to use such compounds in some circumstances, doing so might not always be practically feasible.

Viscosity characteristics of moisture curable compositions are important in at least two respects. First, the viscosity characteristics of the one or more admixture(s) used to prepare the compositions are desirably low enough to facilitate processing at the desired processing temperatures. If the viscosity is too high, the admixtures are more difficult to handle. In the past, ingredients comprising one or more plasticizers have been used to help reduce admixture viscosity. However, admixtures comprising relatively higher NCO content still tend to have higher viscosity than might be desired at the processing stages of manufacture even when a plasticizer is incorporated into such compositions in accordance with conventional practices.

Secondly, after the compositions are made and packaged, the viscosity characteristics of the uncured compositions should be sufficiently stable over time so that the compositions have good shelf life. However, the present inventors have determined that moisture curable compositions with higher NCO content tend to have viscosity stability issues. Merely reducing the NCO content down to levels at which sufficient stability is achieved is not always practical inasmuch as the resultant modified formulation may yield cured materials with poor hardness characteristics depending upon the particular end use application. Merely reducing the NCO content might not even solve the stability problem. The present inventors have also determined that compositions including NCO-functional resins derived from MDI-based materials have a greater tendency to have unstable viscosity characteristics as compared to conventional compositions based upon TDI.

A key technical challenge has been to uncover a way to use relatively higher NCO content while still maintaining stable viscosity characteristics. Another key technical challenge has been how to formulate water-curable compositions with stable viscosity characteristics when those compositions include NCO-functional resins derived from MDI materials.

SUMMARY OF THE INVENTION

The present invention allows compositions incorporating water-curable urethane constituent(s) to be formulated with favorable viscosity and viscosity stability characteristics, while at the same time, preserving desired hardness characteristics. The present invention is particularly useful in applications in which water-curable compositions include NCO-functional resins having relatively high NCO content and/or incorporate MDI-based constituents.

Preferred modes of practicing the invention include implementing one or more formulation strategies to help retain hardness while preserving good viscosity characteristics. These preferred strategies involve (i) balancing scavenger, polyisocyanate and polyfunctional polyol content of the compositions or resins thereof, as the case may be, (ii) formulating an NCO-functional resin with chain extender constituent(s) to enhance viscosity stability, (iii) formulating with one or more plasticizers that enhance viscosity performance, and (iv) combinations of two or more of these strategies.

The resultant compositions are useful in making thin or thick structures for waterproofing, membranes, deck flooring on land or in marine environments, encapsulation, coving, sloping, roofing, caulks, sealants, gaskets, crack repair, and the like. The compositions may also be used to mold a wide variety of urethane/polyurea elastomeric rubber products.

Water curing is easy, reliable, and consistent. The compositions, which can be catalyzed, are mixed with or otherwise allowed to interact with a suitable curing agent, which typically is water or a composition containing water, such as a solution, latex, emulsion, or the like. The compositions then can be easily poured, trowelled, sprayed, rolled, cast, brushed, squeegeed, or otherwise applied. The composition can be combined with a wide variety of additives including granulated rubber, sand, quartz, clay, cement, magnetic particles, and the like for enhanced resiliency, economy, abrasion resistance, skid resistance, and/or the like. The invention has the excellent weatherability and may be cured internally to form a solid mass in which the degree of foaming, if any, can be precisely controlled or at least substantially eliminated as desired.

It has also surprisingly discovered that a substantial stoichiometric excess of water should be present to cure the compositions if foaming is to be substantially avoided. As used herein, "a substantial stoichiometric excess of water" generally means that at least a threshold, stoichiometric excess of water is present to alleviate foaming. As general guidelines, this may involve using at least 5, more preferably at least 10, and more preferably at least 20 times the stoichiometric amount of water needed for curing. If too little water is present, undue foaming will tend to be observed even in some instances in which the composition includes a $CO_2$ scavenger. Using too much water need not be avoided except for practical reasons. For example, up to a certain point, e.g., up to at least about 25 to about 35 times the stoichiometric amount, the water is readily incorporated into the composition. Using greater amounts of water than this may require that some of the excess water be dried or otherwise removed.

The discovery that a certain threshold amount of curing water is needed for excellent foam control is counterintuitive, especially when more reactive NCO compounds and/or higher NCO/OH ratios are used. Conventional wisdom has been that water causes foaming. Consequently, the strong bias in the industry has been to restrict the amount of water, restrict the reactivity of the NCO compounds, and/or restrict the NCO/OH ratio to avoid water-induced foaming activity. In contrast to this anti-water bias, the innovative solution of preferred embodiments of the present invention is not to restrict water for foam control, but to add more.

The present invention offers enhanced practical flexibility for formulating water curable compositions from a wider range of NCO compounds and formulating NCO resins with a wider range of NCO/OH ratios. This advantageously allows the hardness of the resultant cured compositions to be tailored over a wide range as well. For example, depending upon the formulation, cured compositions of the present invention preferably may have any desired hardness in a range from as low as 10 Shore A hardness and as high as 90 Shore A hardness.

Various exemplary embodiments of the present invention are described in the following specification and claims attached hereto.

In one aspect, the present invention includes a water-curable composition having an NCO-functional resin, an amount of at least one $CO_2$ scavenger effective to help reduce foaming when the composition is cured with water, and a viscosity modifying amount of a plasticizer component, wherein the plasticizer component comprises a hydrocarbon plasticizer compound.

In another aspect, the present invention includes a water-curable composition having an NCO-functional resin, an amount of at least one $CO_2$ scavenger effective to help reduce foaming when the composition is cured with water, and a viscosity stabilizing amount of a plasticizer component, wherein the plasticizer component comprises a first, relatively polar plasticizer compound and a second, relatively nonpolar plasticizer compound. Optionally, the water-curable composition can also include a viscosity modifying amount of a third, hydrocarbon plasticizer compound.

In yet another aspect, the present invention includes a water-curable composition having an NCO-functional resin, a $CO_2$ scavenger, and a plasticizer. The NCO-functional resin has an NCO content of less than about 6.5 weight percent based upon the weight of the resin, wherein the resin is derived from ingredients comprising a polyol component and a polyisocyanate component. The polyol component is derived from ingredients comprising about 50 to 80 parts by weight of a diol per 100 parts by weight of the polyol component, wherein the diol has a molecular weight greater than about 500, up to about 0.1 to 10 parts by weight of a chain extender per 100 parts by weight of the polyol component, and about 5 to about 30 parts by weight of a polyfunctional polyol per 100 parts by weight of the polyol component. The $CO_2$ scavenger is present in an amount effective to help reduce foaming when the composition is cured with water. In a preferred embodiment, the $CO_2$ scavenger is present in an amount less than 6 weight percent based upon the total weight of the water-curable composition exclusive of solvent. The plasticizer is present in a viscosity modifying amount.

In yet another aspect, the present invention includes a method of making a water-curable composition. The method includes the step of combining ingredients that comprise a first admixture with a second admixture, wherein the first admixture comprises an NCO-functional resin and a hydrocarbon plasticizer compound, and wherein the second admixture is a slurry comprising at least one solid constituent dispersed in a fluid carrier.

In yet another aspect, the present includes a method of making a water-curable composition, the method including the step of combining ingredients that comprise a first admixture with a second admixture, wherein the first admixture comprises an NCO-functional resin, and wherein the second admixture is a slurry comprising a first, relatively polar plasticizer compound and a second, relatively nonpolar plasticizer compound. Optionally, the first admixture can also include a third, hydrocarbon plasticizer compound.

In yet another aspect, the present invention includes a method of formulating a water curable composition. The method includes the steps of determining information indicative of how one or more plasticizer compounds impact a viscosity stability characteristic of a water curable composition and using the information to formulate a water-curable composition comprising at least one plasticizer compound.

In yet another aspect, the present invention includes a method of formulating a water curable composition. The method includes the steps of determining information indicative of how a viscosity stability characteristic of a water curable composition depends upon an amount of a chain extender compound incorporated into an NCO-functional resin of the composition and using the information to formulate a water-curable composition comprising an NCO-functional resin derived from ingredients comprising the chain extender.

In preferred embodiments, the NCO-functional resin is derived from ingredients including a polyisocyanate component including MDI.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The compositions of the present invention may be single phase mixtures or solutions as well as multiphase dispersions, emulsions, latex compositions, or the like that incorporate at least one isocyanate functional resin derived from a sterically hindered isomer of diphenyl methane diisocyanate ("MDI"). This resin optionally is in admixture with one or more other ingredients. The preferred isocyanate functional resin is obtained by reacting ingredients comprising a stoichiometric excess of a polyisocyanate component and a polyol component.

The weight average molecular weight of the resultant isocyanate functional resin is not critical and may vary over a wide range depending upon the desired mode of use of the resultant composition into which the resin is incorporated. However, if the weight average molecular weight is too low, the cured composition might not have the desired physical and mechanical properties such as Young's modulus, elongation at break, hardness, flexibility or rigidity as the case may be, elastomeric qualities, toughness, resilience, abrasion resistance, or the like. On the other hand, if the weight average molecular weight is too high, compositions incorporating the resin may be too viscous for convenient handling in the desired manner. Balancing these concerns, preferred embodiments of the NCO functional resin have a weight average molecular weight in the range of about 500 to about 10,000, preferably about 1000 to about 6000.

The NCO content of the resultant isocyanate functional resin refers to the weight percent of the resin that constitutes one or more pendant NCO moieties. The NCO content may vary over a wide range depending upon the desired mode in which the invention will be practiced. Generally, if the NCO content is too low, the resin might not have the desired physical and/or mechanical properties. On the other hand, if the NCO content is too high, the resultant polymer might not be as elastomeric as desired and/or might foam more than is desired as the resin cures. Balancing these concerns, representative embodiments of the NCO functional resin have an NCO content in the range of from about 0.1% to about 20%, preferably from about 1 to about 20%, and more preferably from about 1% to about 15%, and most preferably from about 2% to about 10%. Advantageously, as will be described further below, resins of the present invention may be formulated with a higher NCO content than is practical with respect to conventional formulations. The ability to formulate resins with atypically high NCO content provides numerous advantages, including greater toughness and hardness.

It has now been discovered that the NCO content of the resin can impact not just the viscosity of the admixtures into which the NCO-functional resin is used, but also the stability of those viscosity characteristics over time. Specifically, with respect to some embodiments, it has been found that using too much NCO content can render the viscosity characteristics less stable than might be desired for good shelf life. Accordingly, one mode of practicing the principles of the present invention involves determining how the viscosity stability characteristics of a formulation changes with changing NCO content. This information is then used to formulate a composition with desired viscosity stability characteristics.

For example, in representative preferred embodiments having excellent viscosity stability characteristics, it is preferred to limit the NCO content of the moisture curable resin to below about 6.5 weight percent, preferably below about 6 weight percent, more preferably in the range of 2 weight percent to about 6 weight percent. Limiting NCO content in this fashion not only tends to increase the viscosity stability, but also reduces the tendency of the composition to foam during curing. Accordingly, the amount of moisture scavenger incorporated into the compositions is correspondingly reduced as well.

Limiting the NCO content in this fashion, however, may provide cured materials having lower hardness characteristics than might be desired. This loss of hardness may be offset at least to some degree by including an appropriate amount of triol ingredient(s) in the resin formulation. Generally, using greater amounts of triol tends to provide materials that have higher hardness when cured. The use of triol(s) as ingredient(s) to formulate the resin is described further below.

In the practice of the present invention, the polyisocyanate component used to form the isocyanate functional resin preferably comprises at least one polymerizable, isocyanate functional compound that is an isomer or derivative of MDI. In preferred embodiments, that portion of the polyisocyanate component comprising MDI includes at least 10%, more preferably at least about 15%, and more preferably at least about 25% by weight of sterically hindered MDI isomer and/or at least one adduct derived from ingredients comprising a sterically hindered isomer of MDI. "Sterically hindered" with respect to an MDI-based compound means that at least one NCO moiety of the compound is in an ortho or meta, preferably ortho, position relative to another ring substituent.

As a general matter the various isomers of MDI may be generically represented by the following formula:

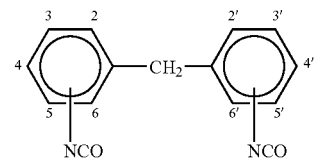

Because MDI is symmetrical, the 2 and 6 positions are equivalent, the 2' and 6' positions are equivalent, the 3 and 5 positions are equivalent, and the 3' and 5' positions are equivalent. Thus, one of the NCO moieties of MDI independently may be deemed to be either at a 2 position (ortho relative to the methylene), 3 position (meta relative to the methylene), or 4 position (para relative to the methylene). In the practice of the present invention, an NCO moiety at either the 2 or 3 position would be sterically hindered. Similarly, the other NCO moiety independently may be a substituent either at a 2' position (ortho relative to the methylene), position 3' (meta relative to the methylene), or 4' position (para relative to the methylene). An NCO moiety at either the 2' or 3' position would be sterically hindered.

Consequently, 2,2'-MDI, 2,3'-MDI, 2,4'-MDI, 3,3'-MDI, and 3,4'-MDI represent sterically hindered MDI isomers, whereas 4,4'-MDI would not be considered to be sterically hindered. Of the sterically hindered isomers, 2,4'-MDI is most preferred as this isomer is economical, commercially available from a number of different vendors, has a favorable reactivity rate for curing, has extremely low volatility (discussed further below), and has very controllable foaming characteristics (i.e., foaming can be alleviated or substantially avoided, as desired) when resins incorporating this isomer are water cured.

The use of a sterically hindered isomer of MDI offers numerous advantages that improve manufacturability, make using the resultant compositions easier, and improve the properties of the resultant compositions when cured. Firstly, all of the MDI isomers have extremely low volatility. For example, the extremely low vapor pressure of 2,4'-MDI is about 1/2800 that of TDI. Indeed, all of the MDI isomers have favorably low vapor pressures of this order of magnitude.

The low vapor pressure of the MDI isomers is an important benefit of using these materials for safety and environmental reasons.

In contrast to conventional practices that are only TDI-based, by using at least some less volatile MDI-based material as at least a portion of the polyisocyanate component, the potential for outgasing of unreacted isocyanate can be dramatically reduced, making the resultant compositions much easier to manufacture and much safer to handle. When using less volatile MDI-based, polyisocyanate reactants, the presence of left-over, unreacted polyisocyanate is more acceptable from a safety perspective and even desirable from the perspective of providing a cured resin with higher urethane/urea content. The volatility of MDI is so low, VOC emissions associated with unreacted MDI are essentially zero at room temperature.

In terms of reducing VOC levels with respect to isocyanate functional materials, sterically hindered MDI isomer(s) can be formulated into isocyanate functional resins using a variety of different strategies. For example, the sterically hindered MDI isomer(s) may be the only isocyanate functional constituent of the polyisocyanate component, or such isomer(s) may be used as a substitute for some of the TDI that might otherwise be used in a formulation, or such isomer(s) may be used in combination with other polymerizable, isocyanate functional compounds that have lower vapor pressures (i.e. that are less volatile) than TDI.

In preferred embodiments, the polyisocyanate component excludes TDI and any other isocyanate functional compound that has a vapor pressure at 25° C. that is about equal to or greater than that of TDI. In more preferred embodiments, the polyisocyanate component comprises only isocyanate functional components whose vapor pressure at 25° C. is about 50% or less, more preferably about 10% or less than that of TDI. In particularly preferred embodiments, the polyisocyanate component includes at least 75% by weight, more preferably at least 90% by weight, and most preferably at least 98% by weight of polyisocyanate materials that are isomer(s) of MDI or are derived from isomer(s) of MDI, subject to the proviso that at least one such MDI isomer is sterically hindered. Advantageously, such MDI-based polyisocyanate components have essentially zero VOC emissions with respect to diisocyanate outgasing. Such compositions are characterized by extremely low toxicity for greatly enhanced safety as well as easier manufacturability from a practical perspective.

Another key advantage of using the sterically hindered isomers of MDI relates to the favorable reactivity that sterically hindered MDI isomers provide to water curable compositions. This reactivity advantage is important in terms of pot life and foaming characteristics. In contrast to the performance of sterically hindered isomers of MDI, some other isocyanate functional reactants (4,4'-MDI by itself being typical of these) yield resins that are too reactive when water cured. The resultant resins tend to have a pot life that is too short for practical reasons and/or that foam excessively when cured. Even foam-alleviating additives, e.g., $CO_2$ scavengers and/or a suitable plasticizer (see discussion below), are not able to provide sufficient foam control if the isocyanate constituent yields a resin that is too reactive.

In those embodiments when pot lives longer than just a couple minutes are desired, a good example of a monomer that is too reactive by itself is 4,4'-MDI. The high reactivity of this compound is due, at least in part, to the fact that the NCO groups are aromatic and sterically unhindered. In contrast to 4,4'-MDI and even though sterically hindered isomers of MDI are aromatic and expected to be relatively reactive, it has been found that the sterically hindered isomers of MDI can be used to form water curable compositions whose foaming can be easily controlled. More surprisingly, using even moderate amounts of a sterically hindered MDI isomer in combination with 4,4'-MDI allows even the reactive 4,4'-MDI to be formulated into water curing compositions that exhibit little if any foaming when cured. As will be described in more detail below, the ability to use a slower reacting MDI isomer in combination with a faster reacting isocyanate material such as 4,4'-MDI allows the curing characteristics (e.g., pot life and the like) to be fairly precisely tailored for specific applications merely be adjusting the relative amounts of the faster and slower reacting isocyanates in the formulation.

Another key advantage of using one or more sterically hindered MDI isomers in a formulation relates to the urethane/urea content of the resultant compositions when cured. This benefit is exploited as a consequence of appreciating that (1) MDI materials have low volatility; and (2) sterically hindered MDI isomers, used alone or in combination with other isocyanates, help to alleviate foaming that might otherwise occur during water curing.

Specifically, the content of polyisocyanate materials that are too volatile generally must be restricted (or avoided as desired) for safety reasons. Similarly, the content of polyisocyanate materials that are too reactive must be restricted (or avoided as desired), as resins made exclusively from such fast reacting materials tend to foam excessively when cured, even in the presence of a $CO_2$ scavenger. Limiting the amount of isocyanate reactants, however, correspondingly limits the potential urethane/urea content of the resultant compositions. This is less than desirable in that some desirable characteristics tend to improve with increasing urethane/urea content. Examples of such characteristics include toughness, hardness, abrasion resistance, modulus, resilience and the like.

Advantageously, however, the sterically hindered MDI isomers of the present invention may be safely and beneficially incorporated into resins in much higher amounts (i.e., thus yielding a higher NCO/OH ratio and/or NCO content) than is prudent or even practically achievable with other polyisocyanates. The selected polyisocyanate(s) of the present invention yield compositions with increased safety due to lesser volatility and reduced tendency to foam excessively due to moderate reactivity. The ability to safely practice such higher NCO:OH ratios enhances the ability to tailor hardness, stability, toughness, and other desirable properties that are a function of urea/urethane content.

Indeed, preferred compositions of the present invention may be beneficially formulated to have high NCO/OH ratios, e.g., ratios of about 1.8 or more, preferably in the range of from about 2.2 to about 10, more preferably in the range of from about 2.2 to about 6. In determining the NCO/OH ratio, the NCO portion of this ratio refers to the number of moles of NCO moieties present in the polyisocyanate component prior to being reacted with the polyol component, and OH refers to the number of moles of OH moieties of the polyol component prior to being reacted with the polyisocyanate component. Notwithstanding the atypically high NCO/OH content of such embodiments, compositions of the invention may be internally cured without undue foaming, if any, and the resultant cured, elastomeric materials tend to exhibit exceptionally high hardness, toughness, and abrasion resistance. Such high performance with respect to these characteristics cannot be achieved so easily in practice with a polyisocyanate component containing only TDI (which is relatively volatile) or only 4,4'-MDI (which is too reactive by itself).

It also has now been discovered that using a blend of polymerizable isocyanate functional monomers comprising a relatively more reactive compound and a relatively less reactive compound allows the pot life/cure rate of the resultant composition to be easily tailored for the desired application. This is beneficial in that neither the faster nor slower reacting compounds by itself may perform as desired in some instances. Using only a faster reacting isocyanate monomer might lead to excessive foaming, whereas using only a slower reacting isocyanate monomer might lead to a pot life/cure time that is too long. Yet, by using two such materials in combination, the resultant blend can be provided with a pot life/cure rate that is intermediate and that is a function of the relative amount of the two materials in the blend. In such blends, increasing the relative amount of the more reactive compound shortens the pot life, while decreasing the relative amount of the more reactive compound increases pot life.

This result is not necessarily intuitive. Combining two independently reactive compounds is not like blending hot water with cold water to obtain a blend of lukewarm water. In contrast to the simplistic temperature averaging that occurs when hot and cold volumes of water are mixed, each reactive isocyanate compound would still be expected to react independently with the curing agent and thereby still demonstrate its respective disadvantages. The fact that the combination provides more favorable curing characteristics while masking the drawbacks of each individual component is thus a surprising, but welcome benefit.

A polyisocyanate component that comprises a blend of a slower reacting, sterically hindered MDI isomer, preferably 2,4'-MDI and/or 2,2'-MDI with the faster reacting 4,4'-MDI is particularly preferred for several reasons. Firstly, such blends are commercially available from a number of sources in various formulations. At least one commercially available blend contains relatively greater amounts of the sterically hindered isomer, another contains a blend in which the isomers are present in roughly equal amounts, and another contains relatively greater amounts of the 4,4'-MDI. Consequently, by formulating with one of these products, or a blend of these products, one can easily formulate compositions with any desired relative amounts of the fast and slow reacting compounds over a wide compositional range. This allows a composition with a particular pot life in the range of from about 2 minutes to about 20 minutes to be easily formulated. Shorter pot lives can be achieved by increasing the catalyst and/or temperature at which curing takes place. Longer pot lives may be achieved by reducing and/or eliminating the catalyst and/or by decreasing the temperature at which curing takes place.

In addition to the isocyanate functional resin comprising the sterically hindered isomer of MDI, the polyisocyanate component optionally may further comprise one or more additional, polymerizable isocyanate functional compounds preferably comprising two or more isocyanate moieties per molecule on average. The optional polymerizable, isocyanate functional compounds may be aliphatic and/or aromatic. The polymerizable, isocyanate functional compounds may be straight, cyclical, fused, and/or branched monomers, oligomers, and/or polymers. Representative examples of optional isocyanate functional compounds include TDI, 4,4'-MDI, as well as other polyisocyanate materials listed or described in U.S. Pat. Nos. 6,262,217 (col. 3); 5,464,921 (col. 4); 5,288,797 (col. 4); 5,459,185 (col. 2); 5,603,798 (col. 3); 5,672,652 (col. 3); 5,852,103 (col. 3); 5,536,805 (col. 6 to col. 7); 4,426,488 (col. 4); 5,962,618 (col. 3 to col. 4); and 5,530,085 (col. 2). Others are also described in the *Encyclopedia of Chemical Technology*, Kirk-Othmer, 2d Ed., vol. 12, pp. 46–47 (1967).

As used herein, the term "monomer" means a polymerizable molecule that forms a basic repeating unit in a polymer chain. "Oligomer" refers to a polymerized compound whose backbone is formed from 2 to 10 monomers. "Polymer" refers to a polymerized compound whose backbone is formed from more than 10 monomers.

"Resin(s)" refers collectively to oligomer(s) and/or polymer(s) as the case may be. The term "molecular weight" as used throughout this specification with respect to oligomers and polymers refers to weight average molecular weight unless expressly noted otherwise.

The polyol component comprises more than one polymerizable OH (hydroxyl) functional compounds, preferably comprising two or more hydroxyl groups, per molecule on average. The polymerizable, hydroxyl functional compounds may be aliphatic and/or aromatic. The polymerizable, hydroxyl functional compounds may be straight, cyclical, fused, and/or branched. The preferred, polymerizable hydroxyl functional compounds include at least one diol, at least one triol, and/or at least one tetrol. Any of these polyol compounds may be monomeric, oligomeric, and/or polymeric as desired. If oligomeric and/or polymeric, the polyol(s) may be selected from one or more hydroxyl functional polyethers, polyesters, polyurethanes, polyacrylics, epoxy resins, polyamides, polyamines, polyureas, polysulfones, combinations of these, or the like. Polyether polyols are preferred as these are commercially available at relatively low cost and are hydrolytically stable.

In one illustrative embodiment, the polyol component preferably includes at least one diol having a molecular weight in the range from about 500 to about 12,000, preferably from about 800 to about 8000; at least one polyfunctional polyol (i.e., a polyol having on average greater than 2.2 OH moieties per molecule) preferably having a molecular weight in the range from 100 to about 12,000, more preferably 500 to 8000, and optionally a chain extender diol and/or diamine having a molecular weight up to about 500. The amount of the diol(s), triol(s), and optional chain extender incorporated into the preferred polyol component may vary over a wide range with beneficial results. Generally, enough of the diol(s) are included to provide the desired degree of elastomeric characteristics, chain length, or other properties that are a function of the diol content; enough of the triol(s) to provide the desired degree of branching and/or hardness; and enough of the chain extender to help build urethane/urea linkages as desired and/or viscosity stability for good shelf life. As general guidelines, suitable formulations would include 10 to 100, preferably about 50 to 80 parts by weight of the diol(s); 0 to 50, preferably 5 to 30 parts by weight of a polyfunctional polyol compound (preferably a monomer or oligomer, more preferably a monomer) having on average more than at least 2.2 OH moieties per molecule, preferably at least 2.5 OH moieties per molecule, and more preferably at least about 3OH moieties per molecule; and 0 to 15, preferably 0.1 to 10 parts by weight of optional chain extender(s) based upon 100 parts by weight of the polyol component. In other embodiments, the polyol component may contain only triol materials optionally in combination with 0 to 15 parts by weight of chain extender per 100 parts by weight of the polyol component.

Representative examples of polyfunctional polyol compounds include triols, tetrols, pentafunctional polyols, hexafunctional polyols, mixtures of such compounds, and the like. Triol materials are preferred. The polyfunctional polyol is advantageously used to enhance the hardness of resultant cured compositions. The polyfunctional polyol is especially advantageously used to enhance hardness in those embodiments in which the NCO content is relatively lower and/or chain extender diol is included so as to achieve good shelf life characteristics. Generally, reducing the NCO content and/or increasing the amount of chain extender in a formulation will tend to reduce hardness of the resultant cured material. Adding or increasing the amount of triol or other polyfunctional polyol in the formulation can be used to offset this reduced hardness at least to some degree.

Accordingly, a preferred formulation of an NCO-functional, water curable resin includes (i) a sufficient amount of polyisocyanate component such that the resultant resin has an NCO content of below about 6.5 weight percent, preferably below about 6 weight percent, more preferably in the range of 2 weight percent to about 6 weight percent; and (ii) a polyol component comprising about 50 to 80 parts by weight of the diol(s); 5 to 30 parts by weight of a polyfunctional polyol compound (preferably a monomer or oligomer, more preferably a monomer) having on average more than at least 2.2 OH moieties per molecule, preferably at least 2.5 OH moieties per molecule, and more preferably at least about 3OH moieties per molecule; and 0.1 to 10 parts by weight of chain extender(s) based upon 100 parts by weight of the polyol component. Such embodiments constitute water-curable resins that can be incorporated into compositions having very stable viscosity characteristics, particularly when formulated with preferred amounts of $CO_2$ scavengers and preferred plasticizer combinations of the present invention. In one preferred embodiment, the $CO_2$ scavenger is present in an amount less than 6 weight percent based upon the total weight of the water-curable composition exclusive of solvent.

The polyisocyanate and polyol components, as well as any other reactants if any to be incorporated into the NCO functional resin, may be reacted together according to a variety of different reaction schemes. For instance, all of the reactants may be combined together and reacted in a single reaction step. The one-step reaction is convenient and quite suitable in most instances. Alternatively, the various reactants may be combined in a series of two or more reaction steps. Multi-step reaction schemes may be useful when it is desirable to control the structure of the resultant resin with relatively greater precision than is possible with a single step reaction.

Any suitable conditions for copolymerizing isocyanate functional materials with hydroxyl functional materials to form an NCO-functional, polyurethane resin may be practiced. Generally, as is well known in the art, the OH and the NCO groups of these reactants will linkingly react with each other to form urethane linkages. The reaction generally is carried out with some degree of heating. A catalyst is generally not needed for this reaction, although a suitable organometallic catalyst such as dibutyltin dilaurate may be used in accordance with conventional practices. The reaction may occur neat (i.e., solventlessly) or in a solvent as desired. In preferred reaction schema, the reactants are combined neat to avoid having to remove any solvent(s) after the reaction is completed. The resultant resin may then be more easily combined neat with the other desired ingredients to provide solventless embodiments of the present invention. In other embodiments intended to include one or more particular solvents, the reaction may occur in any solvent(s), but preferably occurs in at least one of such particular solvents to avoid having to remove the reaction solvent prior to combination with the other ingredients, if any, of the composition.

The polyisocyanate component desirably is present in stoichiometric excess relative to the polyol component to ensure that the resultant resin has pendant NCO functionality that allows the resin to be cured upon reaction with a suitable curing agent. Stoichiometric excess preferably means that the ratio of NCO groups of the polyisocyanate component to the OH groups of the polyol component is greater than 1, preferably from greater than about 1.5 to about 20, more preferably from greater than about 2 to about 10, most preferably from greater than about 2.2 to about 10.

In representative embodiments, an NCO/OH molar ratio of about 2.5 to about 6 would be especially suitable to provide compositions that water cure at a desirable rate without undue foaming, if any, to form elastomeric solids with excellent strength and hardness characteristics.

In addition to the NCO-functional resin, the compositions of the present invention optionally may include one or more additional monomers, one or more additional oligomers, and/or one or more additional polymers. These materials can be thermosetting and/or thermoplastic. Examples include polyethers, polyesters, polyurethanes, polyacrylics, epoxy resins, polyamides, polyimide, polyamines, polyureas, polysulfones, polysiloxanes, fluorinated polymers, polystyrenes and copolymers thereof, melamine-formaldehyde resins, silicones, polycarbonates, polyolefins, phenolic resins, protein, combinations of these, or the like.

As one option, any such monomer, oligomer, and/or polymer may comprise NCO and/or other functionality allowing such material(s) to be cured by the same and/or different mechanism(s) as the NCO functional resin of the present invention. If these materials include NCO functionality, they will tend to form a crosslinked network with the NCO functional resin upon curing. Additionally, the reactive NCO functionality of any such materials desirably is accounted for in the NCO stoichiometry of the formulation. If the curing functionality is different than NCO, such materials will tend to form an interpenetrating polymer network with the NCO functional resin upon curing. As another option, any such oligomers and/or polymers may be thermoplastic materials that form a semi-interpenetrating polymer network with the NCO functional resin upon curing. Additionally, such materials may be miscible with the NCO-functional resin so that blends are a single phase. Alternatively, such materials may be wholly or partially immiscible with the NCO functional resin in some instances so that the materials physically crosslink. When such other material(s) are used, the weight ratio of the NCO-functional resin to such other material(s) may be in the range of from about 1:20 to 20:1.

Additionally, the compositions of the present invention may incorporate one or more additives in accordance with conventional practices as such practices may be constituted from time to time. For example, one or more $CO_2$ scavengers are particularly preferred additives. A $CO_2$ scavenger is desirable due to the evolution of gaseous by-products that tends to occur when NCO functional resins are water cured. By themselves, NCO functional resins tend to outgas $CO_2$ as a reaction by-product when cured with moisture. Such $CO_2$ tends to cause undesirable amounts of foaming and/or blistering when the compositions are water cured. Accordingly, preferred compositions of the present invention incorporate one or more $CO_2$ scavengers to allow the compositions to be cured externally and/or internally without undue foaming. For instance, the use of $CO_2$ scavenger(s) allows representative embodiments of the invention that are several inches thick to be internally water cured quite easily. The resultant cured materials will cure throughout with very little, if any shrinkage or expansion.

In the practice of the present invention, a $CO_2$ scavenger broadly refers to a material physically and/or chemically interacts with gaseous by-products of the water curing reaction, whether the by-product is $CO_2$ or another gas. Such a scavenger thereby helps to alleviate the foaming action that might otherwise occur as such a composition is water cured. A wide variety of $CO_2$ scavengers may be beneficially used in the practice of the present invention. Representative examples include magnesium oxide, magnesium hydroxide, calcium oxide, calcium hydroxide, zinc oxide, combinations of these, and the like. Preferred $CO_2$ scavengers are alkaline.

The $CO_2$ scavenger is desirably present in an amount effective to help reduce the foaming that a composition of the present invention might otherwise experience when water cured. Generally, it is desirable to use stoichiometrically 0.5 to 5, preferably 1 to 4, more preferably 1 to 2 equivalents of $CO_2$ scavenger per equivalent of $CO_2$ to be theoretically generated during water curing, assuming each equivalent of reactive NCO in the composition yields 0.5 equivalents of $CO_2$. In illustrative embodiments, using 1 to 20 parts by weight, preferably 2 to 12 parts by weight, and most preferably 4 to 10 parts by weight of the $CO_2$ scavenger per 100 parts by weight of NCO functional constituents of the composition would be suitable in the practice of the present invention.

It has now been discovered in some embodiments that the amount of $CO_2$ scavenger incorporated into the composition may impact the stability of the composition viscosity over time. Specifically, if the amount of $CO_2$ scavenger incorporated into the composition is too high, the viscosity of the composition may tend to unduly increase during storage. In some instances, the viscosity may become too high for the composition to be used for its intended purpose. The stability problem generally may not addressed merely by reducing the amount of scavenger, inasmuch as reducing the scavenger content may require that the NCO content be correspondingly reduced to avoid undue foaming during curing. This suggests that reducing the respective amounts of both the scavenger and NCO content will provide sufficient stability, and this is indeed the case. However, the hardness of the resultant, cured compositions may be lower than desired. Accordingly, the present invention provides a multi-pronged approach for formulating water curable compositions with good viscosity stability. Firstly, the NCO-functional resin itself is formulated with a relatively low NCO content. In preferred embodiments, the resin has an NCO content of below about 6.5 weight percent, preferably below about 6 weight percent, more preferably in the range of 2 weight percent to about 6 weight percent. Secondly, the amount of scavenger is correspondingly reduced. Preferably, the composition is formulated with less than 6 weight percent of scavenger, preferably from about 1 to about 6 weight percent of scavenger. Third, the NCO-functional resin is formulated with a sufficient amount of triol so as to offset to at least some degree the reduced hardness that would otherwise result. Preferably, the polyol component incorporated into the NCO-functional resin is formulated with at least 5 to 30 parts by weight of a polyfunctional polyol compound per 100 parts by weight of the polyol component.

One or more plasticizers may be incorporated into the compositions for a variety of reasons, including to reduce viscosity and/or to make the composition ingredients easier to mix together. The use of a plasticizer is beneficial as it provides a depression of the glass-transition temperature and viscosity, reduced stiffness and brittleness, and improved processability, e.g., reduced viscosity. In preferred embodiments, appropriate selection of plasticizer(s) enhances the viscosity stability of the compositions over time. Advantageously, the plasticizer functions in many respects like a solvent, but the resultant lower viscosity, fluid composition is still considered to be neat, i.e., solventless.

Most plasticizers are nonvolatile organic liquids or low-melting point solids, which function by reducing the normal intermolecular forces in a resin thus permitting the macromolecules to slide over one another more freely. The type of plasticizer(s) used is not critical in all instances (but see discussion below, where certain plasticizers that help alleviate foaming are preferably used) and generally any plasticizer(s) now or hereafter known to be compatible with urethane chemistry may be used. Examples include polar oils, branched phthalates (including diisoheptyl phthalate, dibutyl phthalate, diisononyl phthalate, diisodecyl phthalate, diisoundecyl phthalate, diisotridecyl phthalate, combinations of these, and the like), branched adipates (diisononyl adipate, dioctyl adipate, diisodecyl adipate, and/or the like) propylene carbonate, hydrocarbon oil such as a paraffinic oil, combinations of these, and the like. Additional plasticizers are also shown in the examples, below.

The use of particular kinds of plasticizers may be desirable in some embodiments. Specifically, compositions of the present invention that incorporate relatively high NCO content that is present either as NCO functionality on a resin constituent and/or present as leftover, unreacted monomer, tend to foam more excessively upon water curing as compared to compositions with a lesser NCO content. The excessive foaming problem may not be sufficiently alleviated to the desired degree even when using less reactive NCO moieties and/or by including a suitable $CO_2$ scavenger in the composition. It has now been surprisingly discovered that the use of one or more particular kinds of plasticizer can function as an anti-foaming agent which is particularly beneficial in embodiments of the invention have higher NCO content, e.g., an NCO content of 3%, preferably 5%, and more preferably 8% or greater. In other words, the appropriate selection of plasticizer can help formulate water curable compositions with higher NCO content and/or more reactive NCO moieties than might otherwise be feasible when excessive foaming during curing is to be avoided.

Consequently, preferred modes of practicing the present invention involve formulating compositions with one or more plasticizers that have the ability to help alleviate foaming activity of the compositions when water cured. The ability of a plasticizer to alleviate foaming is thus an exceptionally useful selection criterion to use when screening one or more plasticizer candidate(s) that might be incorporated into a water curable composition. For example, experimentation may be performed to assess the impact that one or more plasticizers might have upon the foaming activity of one or more formulations. The ability of such plasticizer(s) to alleviate foaming may then be used as a factor in deciding whether to incorporate the plasticizer(s) into a particular commercial formulation.

Using such screening procedures, it has now been discovered that the branched, polar plasticizers such as the branched phthalates have foam-alleviating characteristics. Thus, incorporating at least one of these materials into the compositions of the invention is highly preferred to help facilitate the use of higher NCO content and/or more reactive NCO moieties. These plasticizers are particularly useful in helping to reduce foaming activity when the polyisocyanate component of the preferred NCO functional resin includes an isomer, or mixture of isomers, of MDI. Of the branched phthalates, diisononyl phthalate (DINP) presently is most preferred.

The nature of the plasticizer(s) also impacts the composition viscosity at one or more stages of manufacture as well as the viscosity characteristics of the resulting composition. For instance, preferred compositions, as described below, are prepared by combining a first prepolymer admixture (i.e., a composition comprising at least one NCO-functional, moisture-curable resin) with a second slurry mixture (i.e., a composition comprising at least one solid constituent dispersed in a fluid medium. The plasticizer(s) can impact the viscosities of each, individual admixture. The plasticizer(s) can also impact the viscosity and viscosity stability of the composition that results when ingredients comprising the two admixtures are combined. Accordingly, one or more plasticizer(s) are desirably incorporated into at least one of the prepolymer admixture or slurry admixture. More preferably, one or more plasticizer(s) are incorporated into each of the prepolymer and slurry admixtures, respectively.

More specifically, one preferred embodiment of the prepolymer admixture, and hence the resultant water curable composition into which the prepolymer admixture is incorporated, includes a plasticizer component including one or more plasticizers, wherein at least one of such plasticizer(s) is a hydrocarbon. Representative examples of hydrocarbon plasticizers include hydrocarbon plasticizer. It has been found that prepolymer admixtures including at least one hydrocarbon plasticizer have a viscosity that is on the order of 50% of the viscosity of an otherwise identical admixture containing another kind of plasticizer. This dramatic reduction in viscosity is beneficial, because handling and processing of the admixture and/or the resultant composition is greatly eased. It has also been found that water-curable compositions that include NCO-functional resins having relatively high NCO content and that also include at least one hydrocarbon plasticizer can have and maintain stable viscosity characteristics over a long period of time. Similarly, it has been found that water-curable compositions that include NCO-functional resins that incorporate MDI-based constituents and that also include at least one hydrocarbon plasticizer can have and maintain stable viscosity characteristics over a long period of time.

Additionally, one preferred embodiment of the slurry admixture and/or prepolymer admixture, and hence the resultant water curable composition into which the slurry admixture is incorporated, includes a plasticizer component including a first relatively polar plasticizer ingredient and a second relatively nonpolar plasticizer ingredient. Preferably, such plasticizer component is incorporated into the slurry admixture. Surprisingly, it has been found that use of such a plasticizer component not only provides a slurry with a suitable viscosity, but it also enhances the viscosity stability of the resultant composition. Embodiments including a plasticizer with both relatively polar and nonpolar constituents retain a high degree of their initial viscosity characteristics over a long period of time. For example, in one useful embodiment, the initial viscosity might vary by only 1–3 centipoise after six months of being packaged in airtight containers.

The weight ratio of the first, relatively polar plasticizer ingredient(s) to the second, relatively nonpolar plasticizer ingredient(s) may vary over a wide range. In typical embodiments this weight ratio may be in the range of 1:19 to 19:1. Preferably, this ratio is in the range of 1:19 to 1:10, more preferably 1:10 to 1:2.

As used in the context of the present invention, the terms "polar" and "nonpolar" can refer to the degree of charge polarization or dipole moment associated with a material relative to another material. Assessing relative polarity of molecules can involve consideration of several factors. For example, some common factors in assessing molecular polarity of individual molecules include individual bond polarities, molecular geometry, and polarities of specific groups or combinations of groups.

One way of obtaining an idea of relative polarity between plasticizer molecules is to consider the ratio of oxygen atoms to carbon atoms for each plasticizer compound and compare the ratios. Generally, as the ratio of oxygen atoms to carbons atoms increases for a given plasticizer, the polarity increases. For example, a useful plasticizer in the present invention, polypropylene carbonate, has a molecular formula of $C_4H_6O_3$ and thus has a ratio of oxygen atoms to carbon atoms of 3/4. In contrast, another useful plasticizer in the present invention includes, diisononyl phthalate, has a molecular formula of $C_{26}H_{42}O_4$ and thus has a ratio of oxygen atoms to carbons of 4/26. In comparing the ratios of propylene carbonate to diisononyl phthalate, it can be determined that propylene carbonate is relatively more polar than diisononyl phthalate. In other words, in this comparison, propylene carbonate can be considered relatively polar and diisononyl phthalate can be considered relatively non-polar. Preferably, after the ratios of oxygen to carbon atoms are determined for two plasticizers and the plasticizers are categorized as relatively polar and non-polar, a Polarity Index can be calculated. Polarity index is the ratio of P1/P2, where P1 is the ratio of oxygen atoms to carbon atoms for the relatively polar plasticizer and P2 is the ratio of oxygen atoms to carbon atoms for the relatively non-polar plasticizer. One or more Polarity Index value(s) can be calculated for a plasticizer component, to be incorporated in a slurry and/or prepolymer admixture, using any suitable combination of plasticizers. For example, a plasticizer may be used in calculating more than one Polarity Index for a given plasticizer component. Moreover, because the nonpolar and polar characteristics of the first and second plasticizer compounds are relative to each other, a particular plasticizer compound may be relatively polar in some comparisons (e.g., in a first Polarity Index calculation for a plasticizer component), but nonpolar in other comparisons (e.g., in a second Polarity Index calculation for a plasticizer component).

In useful embodiments of the present invention, the Polarity Index values can be greater than 1.0, preferably greater than 1.1 (e.g., "greater than 1.1" would include the Polarity Index value of approximately 1.2 for dioctyl adipate and diisononyl phthalate, where dioctyl adipate is the relatively polar plasticizer and diisononyl phthalate is the relatively non-polar plasticizer), more preferably greater than 2.0, even more preferably greater than 3.0, and still even more preferably greater than 4.0.

Keeping this in mind, representative examples of polar and nonpolar plasticizers can be selected from a wide variety of different plasticizer compounds. In representative embodiments, the relatively polar plasticizer(s) may be selected from ingredients such as dioctyl adipate, propylene carbonate, combinations of these, and the like, while the relatively nonpolar plasticizer may be selected from ingredients such as diisononyl phthalate, combinations of these, and the like.

In a particularly preferred mode of practicing the invention, the prepolymer admixture comprises a hydrocarbon plasticizer and the slurry admixture comprises a first, relatively polar plasticizer and a second, relatively nonpolar plasticizer.

The amount of plasticizer(s) used in the compositions may vary depending upon the intended mode of use. Generally, using 0 to 50, preferably 10 to 25 parts by weight of plasticizer(s) per 100 parts by weight of the composition would be suitable in many instances.

Other examples of one or more other ingredients that may be beneficially incorporated into the compositions of the present invention include solvent, colorants, slip modifiers, thixotropic agents, foaming or antifoaming agents as the case may be, flow or other rheology controlling agents, antioxidants, inorganic acids, antisettling agents, moisture scavengers such as p-toluene sulfonyl isocyanate, ultraviolet stabilizers, gloss agents, antigloss agents, fungicides, bactericides, organic and/or inorganic particles which may be amorphous or crystalline, opacifiers, dispersants, antistatic agents, and/or the like.

The compositions may be cured internally and/or externally using one or more suitable curing agents optionally in the presence of a suitable catalyst such as organometallic compounds (e.g., dibutyltindilaurate) and/or tertiary amines. Suitable curing agent(s) generally comprise water (as hot or cold liquid water, steam, vapor, humidity or the like) optionally in combination with one or more other compounds having functionality capable of curingly reacting with the NCO moieties of the resin. It may be advantageous in some instances to use relatively low levels of other reactive curing agents, e.g., up to 10% of the stoichiometric amount on a molar basis, in combination with moisture to improve processing, handling, and/or performance characteristics. For example, amines such as those available under the Jeffamine trade designation may be used as thixotropic agents. Representative examples of other suitable curing agents include polyols (such as diols, triols, tetrols, or higher OH functional compounds), polyamines (such as those compounds including two or more amine moieties per molecule on average), combinations of these, and the like. The preferred curing agent is moisture, as moisture is economical and effective. The desired amount of curing agent can be mixed into the bulk of the composition to provide internal curing and/or can be present in the ambient for external curing. Internal curing is preferred to help ensure that the composition cures throughout.

The desired amount of curing agent to be used may vary within a wide range, but typically is present in stoichiometric excess to help ensure that substantially all of the NCO functionality of the composition is reacted. A distinct advantage of these compositions is that little precision is needed or even desirable when determining how much curing agent to add. It is common and even good practice to add a substantial stoichiometric excess of curing agent. While the curing mechanism is not fully understood, it is believed that the excess curing agent is readily incorporated in some fashion into the cured material. This is evidenced by data showing that the material undergoes very little if any weight loss during curing that would be expected to occur if excess water or other curing agent were to evaporate or otherwise be removed from the system. For example, cured compositions of the present invention have retained their elastomeric properties at temperatures below the freezing point of water. Additionally, the cured material retains its elastomeric properties over a wider range of temperatures than one might expect if free water were retained in the system. As general guidelines for embodiments that are water cured, curing may be achieved by mixing 100 parts by volume (or weight) of the composition with 1 to 100, preferably 5 to 50, more preferably about 15 to 30 parts by volume (or weight) of water.

For internal or external curing, as the case may be, the curing agent may be at any suitable temperature when mixed with the composition, depending upon factors including the ambient conditions, the desired pot life, the intended application, and the like. Generally, pot life decreases as the temperature of the curing agent increases. For example, in those embodiments in which the curing agent is water, the curing agent may be supplied as cold or hot water, steam, vapor, or the like. Optionally, all or a portion of a suitable catalyst, if any, may be mixed with the composition and/or the curing agent to facilitate the curing reaction. Dibutyl tin dilaurate is an example of a suitable catalyst, but any catalyst now or hereafter known to be suitable for facilitating the curing reaction between the particular curing agent(s) being used and the NCO moieties may be used.

For illustrative purposes, the present invention will now be described in connection with the manufacture and use of a particularly preferred mode of practicing the principles of the present invention. A pre-mix comprising the NCO functional prepolymer is prepared. To do this, the polyol component and a stoichiometric excess of the polyisocyanate component are combined and mixed together. One or more additional ingredients may also be incorporated into this pre-mix as desired so long as any such ingredients do not unduly interfere with the polymerization reaction between the polyol component and the polyisocyanate component. Any such additional ingredients should also be tolerant to the temperature at which the polymerization is to take place. As one example, a suitable amount of plasticizer (e.g., 1 to 50 parts by weight per 100 parts by weight total polyisocyanate component and polyol component), solvent (e.g., 1 to 80 parts by weight per 100 parts by weight total polyisocyanate component and polyol component), an antioxidant (e.g., 0.1 to about 5 parts by weight per 100 parts by weight total polyisocyanate component and polyol component), and/or a catalytic amount of a suitable catalyst may be included in the pre-mix. Preferably, any solid additives are desirably excluded from the pre-mix at this point, but may be added later as described below.

The ingredients of the pre-mix are then allowed to react at a suitable temperature for a suitable duration. Representative reaction conditions involve heating the mixture in a closed reactor, optionally under an inert atmosphere, at 140° F. to about 240° F., preferably about 210° F. to about 230° F. for a duration of about 5 minutes to 8 hours, preferably about 1 to 3 hours. Infrared spectroscopic analysis is one suitable approach that may be used to monitor the progress of the reaction. The reaction may be deemed to be complete when such analysis shows that at least substantially all of the OH is consumed. To prevent premature curing of the resultant NCO functional prepolymer, the moisture, free amine, and free polyol contents of the resultant reaction product are restricted.

If needed, i.e., if one or more ingredients of the composition were not incorporated into the pre-polymer pre-mix, one or more additional admixtures may be prepared from the remaining ingredients, if any, of the composition. This will be the case, for example, if the ingredients include any solid materials, a $CO_2$ scavenger, and/or temperature sensitive materials. Materials that can function as a curing agent for the prepolymer are generally excluded from the admixture to a sufficient degree so that the prepolymer does not cure prematurely when the admixture and prepolymer pre-mix are combined. A representative admixture is a slurry comprising a plasticizer (which may function as a slurry solvent, an optional solvent (desirably excluded if the final composition is intended to be solventless), a $CO_2$ scavenger, a moisture scavenger if needed or desirable, a clay and/or other inorganic particle, a colorant, a particle dispersant, and the like. Any suitable equipment may be used to make the admixture, although equipment that allows the resultant admixture to have a homogeneous, smooth composition is preferred. As one example, a Cowles mixer has been found to be suitable, as it allows homogeneous slurries to be formed with some grinding of the solid particulate constituents during mixing. A representative, smooth admixture of the present invention may measure about 5 on a Hegman gauge.

The resultant admixture and the pre-polymer mixture may then be mixed together. Additional additives may also be incorporated into the composition at this point, if desired. For example, all or a portion of the desired curing catalyst may be incorporated into the composition. The combined composition is then optionally heated at a temperature from about 35° F. to about 250° F. for about 5 minutes to 24 hours, preferably about 180° F. to about 240° F. for about 1 to 3 hours. After heating, additional additives may also be incorporated into the mixture while it is still hot and/or after the composition has cooled at least to some degree. Typical additives that may be incorporated into the composition at this point include, for example, an inorganic acid, and/or one or more additional oligomeric and/or polymeric materials. The resultant composition may then be degassed, cooled, and packaged in suitable airtight containers for storage.

Advantageously, the resultant composition has excellent storage stability. At the time of use, the composition may be combined with (for internal curing) or exposed to (for external curing) a suitable amount of the desired curing agent(s), additional catalyst if desired, and then used in the desired manner to form seamless, monolithic structures. The composition may be sprayed, coated, rolled, brushed, poured, injected, trowelled, and/or the like, as desired and will filly cure throughout. The composition may be used to form a wide variety of thick or thin coatings, membranes, seals, caulking, filler, glue, encapsulation, molded articles or the like.

A representative utility of the composition involves using the composition as a base coat for pedestrian or vehicular surfaces including walkways, flooring and stairwells, decks in land-based or marine environments, roadways, parking lots, parking areas including garages, aprons between roadways and parking areas, and the like. The compositions can also be used to help form airtight and waterproof seals around all or a portion of ductwork, piping, plumbing, tools, equipment, roofing, wood structures, hardboard structures, concrete structures, architectural structures, artistic structures, decorative items, and the like.

In a representative application in which the composition is to be internally cured, the composition will be supplied in an airtight and waterproof container. At the time of use, all or a portion of the composition is combined with a catalyst and the curing agent, e.g., hot or cold water. Using too much catalyst is not necessarily harmful to the quality of the resultant cured composition, but the pot life of the uncured composition may be too short for convenient handling. It is also an option not to use any catalyst, although the pot life and cure time may end up being longer than is desired. In those instances in which the use of a catalyst is desired, the catalyst may be diluted by any desired amount with an inert medium (e.g., solvent and/or plasticizers) to facilitate mixing characteristics. For example, in some embodiments the catalyst is advantageously supplied as a mixture of 0.1 to 300 parts by weight of catalyst per 100 parts by weight of a plasticizer compatible with the composition and catalyst. Preferably, about 0.5 to 20, more preferably about 1 to 2 grams of total catalyst are used per 100 gallons of composition. The amount of catalyst to be added at the time of use may be reduced by the amount of catalyst incorporated into the composition as supplied. The catalyst preferably is added before the curing agent is added. When using water as the curing agent, using about 1 to 300 parts by volume of water per 100 parts by volume of composition is suitable. In preferred embodiments 10 to 50 preferably 15 to 30, more preferably 25 parts by volume of water are used per 100 parts by volume of the composition. After adding the catalyst, if any, and curing agent, the composition is then used in the desired manner and allowed to cure. A tough, seamless, monolithic structure results. If the curing agent and composition are well mixed, the composition will cure throughout its bulk, making it possible to form structures that are as thick or as thin as desired.

In other embodiments of the invention, it may be desirable to formulate a composition that exhibits some degree of foaming upon curing. Advantageously, the present invention allows foaming characteristics to be easily formulated. For example, this may be achieved by one or more of reducing the amount of $CO_2$ scavenger, adjusting the ratio of 2,4'-MDI to 4,4'-MDI, adjusting the amount of plasticizer, and/or the like. Compositions that moderately foam may be desirable, for instance, as base coats underlying more rigid top coats in flooring applications to provide a flooring with a comfortable feel.

Representative embodiments of the present invention will now be described with reference to the following examples that illustrate the principles and practice of the present invention. In these examples:

Mondur ML is a mixture of 2,4'-MDI and 4,4'-MDI with about 50 to 60 weight percent of 2,4'-MDI.

Lupemate MI is a mixture of 2,4'-MDI and 4,4'-MDI with about 45 to 55 weight percent of 2,4'-MDI.

Lupemate MM 103 is a carbodiimide modified mixture of 2,4'-MDI and 4,4'-MDI with about 2 weight percent of 2,4'-MDI.

Lupemate MS is a mixture of 2,4'-MDI and 4,4'-MDI with about less than 2 weight percent of 2,4'-MDI.

Lupemate ISO 253 is a mixture of 2,4'-MDI and 4,4'-MDI with about less than 4 weight percent of 2,4'-MDI.

Rubinate 9433 is a mixture of 2,4'-MDI and 4,4'-MDI with about 25 weight percent of 2,4'-MDI.

EXAMPLE I

Preparation Of Sample 1

A prepolymer was prepared by mixing 43 parts by weight by weight of a 2000 molecular weight (all molecular weights refer to weight average molecular weight unless otherwise noted) polypropylene glycol diol (Pluracol P 2010) and 5 parts by weight by weight of a 4800 molecular weight polypropylene glycol triol (Pluracol P 1421) with 20 parts by weight by weight of methylene diphenyl diisocyanate (Lupemate MI). The methylene diphenyl diisocyanate was a commercial blend of about 45 to 51% by weight 4,4'-MDI and about 49 to 55% by weight 2,4'-MDI. In addition, the ingredients also included 0.2 parts by weight by weight of DBPC-BHT antioxidant and 6 parts by weight by weight of Diisononyl phthalate (DINP) as plasticizer/solvent. The ingredients were heated at about 230° F. for about 2 hours in a closed reactor vessel.

The product was an NCO functional prepolymer with an average NCO content of 6.5%. The prepolymer viscosity after cooking was 2900 cps at 80° F.

Separately, a slurry was prepared by mixing 16 parts by weight of Diisononyl phthalate with 2 parts by weight of white paste (mixture of 70 parts by weight $TiO_2$, 29.3 parts by weight of DINP plasticizer, 0.7 parts by weight of dispersing agent Disperplast 1142) and 0.2 parts by weight of dispersing agent Disperplast 1142. Then, 0.3 parts by weight of hydrophobic amorphous fumed silica (Arosil R-972) was added to the slurry along with a sufficient amount of a moisture scavenger (para-toluene sulfonyl isocyanate) to obtain a moisture content of no more then 0.02%. Then 6.8 parts by weight of magnesium oxide were added. The mixing of the slurry occurred in a Cowles mixer as ingredients were added, which provided a homogeneous, smooth slurry measuring 5 on the Hegman gauge. The viscosity of the slurry was 4700 cps at 80° F.

The resultant slurry and the prepolymer were then mixed together. To this mixture, was added a very small amount of dibutyltin dilaurate, e.g., about 0.02 grams per gallon. The mixture was then heated for 0–120 minutes at 230° F. (Note: in these examples, samples 1–6 were heated in this manner for about 90 to 120 minutes, while the other samples were not heated. After heating, 0.02 parts by weight of inhibitor (10 parts by weight of phosphoric acid (85%) and 90 parts by weight of propylene carbonate), 0.14 parts by weight of polymethylalkylsiloxane, 0.4 parts by weight of polyacrylate copolymer, and 0.07 parts by weight of polymer modified poly-dimethyl-polysiloxane were added to the mix. The mixture was then degassed and cooled to 130–150° F. before packaged in an airtight container.

Prior to packaging, working life, i.e., pot life, was tested. 100 grams of material was combined with 0.05 gram of dibutyltindilaurate and mixed with a spatula until a uniform mixture was formed. 23 parts of tap water were also added to the mixture which was then mixed with a paint mixer attached to a hand drill until homogeneous. The working life i.e. the pot life, was about 10 to 12 minutes.

EXAMPLE 2

Preparation of Samples 2–10

Samples 2 through 10 were prepared and tested in accordance with the procedure of Example 1, except that the formulations shown in Tables 2-1 and 2-2 were used. Additionally, the catalyst dioctyltin mercaptide was used in Samples 6–10 in place of dibutyltin dilaurate. The composition and data for Sample 1 is included for comparison purposes. The amounts of ingredients shown in the tables are given on a parts by weight basis.

TABLE 2-1

| Ingredients | 1 | 2 | 3 | 4 | 5 | 6 | 7 | 8 | 9 | 10 |
|---|---|---|---|---|---|---|---|---|---|---|
| Prepolymer (1) | | | | | | | | | | |
| Mondur ML mix of 4,4' and 2,4' MDI | | 20 | | | | | | 24 | | 26.5 |
| Lupernate MI mix of 4,4' and 2,4' MDI | 20 | | | | 16 | 26.5 | 20 | | 24 | |
| Lupernate MM 103 4,4'-MDI | | | 23 | | | | | | | |
| Rubinate 9433 mix of 4,4' and 2,4' MDI | | | | 21 | | | | | | |
| Pluracol P 2010 diol | 43 | 43 | 40 | 42 | 47 | 40.2 | 43 | 34 | 34 | 40.2 |
| Pluracol P 1421 triol | 5 | 5 | 5 | 5 | 5 | 5.3 | 5 | 7 | 7 | 5.3 |
| BHT antioxidant | 0.2 | 0.2 | 0.2 | 0.2 | 0.2 | 0.2 | 0.2 | 0.2 | 0.2 | 0.2 |
| Diisononyl phthalate | 6 | 6 | 6 | 6 | 6 | | | 6 | 6 | |
| Propylene Carbonate | | | | | | 5 | 6 | | | 5 |
| % NCO - checked | 6.8 | 7.03 | 7.2 | 6.7 | 4.95 | 9.35 | 6.8 | 9 | 9.16 | 9.54 |
| Viscosity CPS @ 80° F. | 2900 | 2170 | 4660 | 3940 | 3760 | 1510 | 2000 | 2150 | 1700 | 1530 |

TABLE 2-2

| Ingredients | 1 | 2 | 3 | 4 | 5 | 6 | 7 | 8 | 9 | 10 |
|---|---|---|---|---|---|---|---|---|---|---|
| Slurry (2) | | | | | | | | | | |
| Diisononyl phthalate | 16 | 16 | 16 | 16 | 16 | | | 16 | 16 | |
| Propylene Carbonate | | | | | | 10 | 16 | | | 10 |
| White Paste | 2 | 2 | 2 | 2 | 2 | 2 | 2 | 2 | 2 | 2 |
| Disperplast 1142 dispersant | 0.2 | 0.2 | 0.2 | 0.2 | 0.2 | 0.2 | 0.2 | 0.2 | 0.2 | 0.2 |
| Arosil R-972 amorphous silica | 0.3 | 0.3 | 0.3 | 0.3 | 0.3 | 0.3 | 0.3 | 0.3 | 0.3 | 0.3 |
| Magnesium oxide | 6.8 | 6.8 | 6.8 | 6.8 | 6.8 | 9.7 | 6.8 | 9.7 | 9.7 | 9.7 |
| Moisture scavenger p-toluene sulfonyl isocyanate | Sufficient amount to obtain moisture content of no more than 0.02% | | | | | | | | | |
| Viscosity CPS @ 80° F. | 4700 | 4700 | 4700 | 4700 | 4700 | n/a | 5500 | 4280 | n/a | n/a |
| Add to mixture of 1 and 2 | | | | | | | | | | |
| Di butyl Tin Dilaurate | | 0.02 gram/gallon | | | | no | no | no | no | no |
| Inhibitor | 0.02 | 0.02 | 0.02 | 0.02 | 0.02 | 0.02 | 0.02 | 0.02 | 0.02 | 0.02 |
| Polymethylalkylsiloxane | 0.14 | 0.14 | 0.14 | 0.14 | 0.14 | 0.14 | 0.14 | 0.14 | 0.14 | 0.14 |
| Polyacrylate copolymer | 0.4 | 0.4 | 0.4 | 0.4 | 0.4 | 0.4 | 0.4 | 0.4 | 0.4 | 0.4 |
| Polymer modified poly-dimethyl-polysiloxane | 0.07 | 0.07 | 0.07 | 0.07 | 0.07 | 0.07 | 0.07 | 0.07 | 0.07 | 0.07 |
| Viscosity CPS @ 80° F. | 4500 | 3500 | 5500 | 5500 | 6000 | 1800 | 3000 | 3200 | 2900 | 1800 |
| Work life (min) | 10 to 12 | 12 to 13 | 3 to 4 | 7 to 8 | 12 to 13 | 6 to 7 | 14 to 15 | 12 to 13 | 14 to 15 | 7 to 8 |
| Foaming Results | No | No | Yes | No | No | Yes | No | No | No | Yes |
| Hardness - Shore A | 72 | 75 | 70 | 65 | 57 | 75 | 65 | 90 | 82 | 80 |

EXAMPLE 3

Samples 11–21 were prepared and tested in accordance with the procedure of Example 1, except that the formulations in Tables 3-1 and 3-2 were used. The amounts of ingredients shown in the tables are given on a parts by weight basis.

In the tables of this example, the following terminology was used:
Y—Yes,
N—No,
G—Glossy,
F—Flat
W—With Catalyst
W/o—Without Catalyst-->Same procedure as With Catalyst except 0.02 gram of Diotyltin Mercaptide is excluded.

Procedure for checking work life for samples 11–21: @ 80° F. Take 100 grams of material and add 0.02 grams of dioctyltin mercaptide. To this mixture, add 23 grams of tap water. Mix for about 1 to 2 minutes and then check for non-flow characteristics.

TABLE 3-1

| Products | 11 | 12 | 13 | 14 | 15 | 16 | 17 | 18 | 19 | 20 | 21 |
|---|---|---|---|---|---|---|---|---|---|---|---|
| Prepolymer (1) | | | | | | | | | | | |
| Lupernate MI | 20 | 20 | 20 | 20 | 20 | 20 | 20 | 20 | 20 | 20 | 20 |
| Pluracol P 2010 | 43 | 43 | 43 | 43 | 43 | 43 | 43 | 43 | 43 | 43 | 43 |
| Pluracol P 1421 | 5 | 5 | 5 | 5 | 5 | 5 | 5 | 5 | 5 | 5 | 5 |
| BHT | 0.2 | 0.2 | 0.2 | 0.2 | 0.2 | 0.2 | 0.2 | 0.2 | 0.2 | 0.2 | 0.2 |
| % NCO - checked | 7.2 | 7.2 | 7.2 | 7.2 | 7.2 | 7.2 | 7.2 | 7.2 | 7.2 | 7.2 | 7.2 |
| Viscosity CPS @ 80° F. | 5400 | 5400 | 5400 | 5400 | 5400 | 5400 | 5400 | 5400 | 5400 | 5400 | 5400 |
| Slurry (2) | | | | | | | | | | | |
| Diisononyl phthalate | 22 | | | | | | | | | 20 | |
| Dioctyl Adipate | | 22 | | | | | | | | | |
| 2,2,4-trimethyl-1,3-pentanediol di isobutyrate | | | 22 | | | | | | | | |
| Dibutyl Phathalate | | | | 22 | | | | | | | |
| Dibasic Ester | | | | | 22 | | | | | | |
| Propylene Carbonate | | | | | | 22 | | | | | |
| Aromatic Naptha | | | | | | | 22 | | | | |
| n-paraffinic hydrocarbon | | | | | | | | 22 | | | |
| Propylene Glycol Monomethyl Ether Acetate | | | | | | | | | 22 | | |
| Aliphatic Naptha | | | | | | | | | | 22 | |
| Petroleum Hydrocarbon (Light napthanic extract) | | | | | | | | | | | 22 |
| White Paste | 2 | 2 | 2 | 2 | 2 | 2 | 2 | 2 | 2 | 2 | 2 |
| Disperplast 1142 | 0.1 | 0.1 | 0.1 | 0.1 | 0.1 | 0.1 | 0.1 | 0.1 | 0.1 | 0.1 | 0.1 |
| Arosil R-972 | 0.3 | 0.3 | 0.3 | 0.3 | 0.3 | 0.3 | 0.3 | 0.3 | 0.3 | 0.3 | 0.3 |
| Moisture scavenger | Sufficient amount to obtain moisture content of no more than 0.02% | | | | | | | | | | |
| Magnesium oxide | 6.8 | 6.8 | 6.8 | 6.8 | 6.8 | 6.8 | 6.8 | 6.8 | 6.8 | 6.8 | 6.8 |

TABLE 3-2

| Products | 11 | | 12 | | 13 | | 14 | | 15 | | 16 | |
|---|---|---|---|---|---|---|---|---|---|---|---|---|
| Add to mixture of 1 and 2 | | | | | | | | | | | | |
| Inhibitor | 0.02 | | 0.02 | | 0.02 | | 0.02 | | 0.02 | | 0.02 | |
| Polymethylalkylsiloxane | 0.14 | | 0.14 | | 0.14 | | 0.14 | | 0.14 | | 0.14 | |
| Polyacrylate copolymer | 0.4 | | 0.4 | | 0.4 | | 0.4 | | 0.4 | | 0.4 | |
| Polymer modified poly-dimethyl-polysiloxane | 0.07 | | 0.07 | | 0.07 | | 0.07 | | 0.07 | | 0.07 | |
| Viscosity CPS @ 80° F. (after 24 Hrs) | 2630 | | 1550 | | 1560 | | 2200 | | 940 | | 1250 | |
| 0–2 hrs heat @ 200° F., cool to 80° F. (Viscosity, CPS) | 4100 | | 2000 | | 2400 | | 2900 | | 1400 | | 1600 | |
| | W | W/o | W | W/o | W | W/o | W | W/o | W | W/o | W | W/o |
| Work life (mins) | 13 | 20 | 13 | 18 | 9 | 12 | 11 | 16 | 9 | 13.5 | 10 | 12 |
| Hardness - Shore A | 70 | 70 | 75 | 72 | 73 | 73 | 70 | 70 | 70 | 68 | 35 | 32 |
| Foaming Results (30 gram Casting) | N | N | N | N | N | N | N | N | N | N | Y | Y |
| Oil Bleed | N | N | N | N | N | N | N | N | N | N | N | N |
| Surface Appearance | G | G | G | G | G | G | G | G | G | G | G | G |
| Cracking (30 gram Casting) | N | N | N | N | N | N | N | N | Y | N | N | N |
| White paste: | | | | | | | | | | | | |
| Diisononyl phthalate | 29 | | | | | | | | | | | |
| Disperplast 1142 | 1 | | | | | | | | | | | |
| TiO2 | 70 | | | | | | | | | | | |
| Inhibitor: | | | | | | | | | | | | |
| Propylene Carbonate | 90 | | | | | | | | | | | |
| Phosphoric acid (85%) | 10 | | | | | | | | | | | |

TABLE 3-2-continued

| Products | 17 | | 18 | | 19 | | 20 | | 21 | |
|---|---|---|---|---|---|---|---|---|---|---|
| Add to mixture of 1 and 2 | | | | | | | | | | |
| Inhibitor | 0.02 | | 0.02 | | 0.02 | | 0.02 | | 0.02 | |
| Polymethylalkylsiloxane | 0.14 | | 0.14 | | 0.14 | | 0.14 | | 0.14 | |
| Polyacrylate copolymer | 0.4 | | 0.4 | | 0.4 | | 0.4 | | 0.4 | |
| Polymer modified poly-dimethyl-polysiloxane | 0.07 | | 0.07 | | 0.07 | | 0.07 | | 0.07 | |
| Viscosity CPS @ 80° F. (after 24 Hrs) | 590 | | 2700 | | 550 | | 1000 | | 4350 | |
| 0–2 hrs heat @ 200° F., cool to 80° F. (Viscosity, CPS) | 870 | | 4100 | | 800 | | 1200 | | 6500 | |
| | W | W/o | W | W/o | W | W/o | W | W/o | W | W/o |
| Work life (mins) | 10.5 | 20 | 3.5 | 4.5 | 9 | 12 | 8 | 11 | 9 | 10 |
| Hardness - Shore A | 80 | 78 | 69 | 67 | 74 | 72 | 77 | 75 | 76 | 75 |
| Foaming Results (30 gram Casting) | N | N | N | N | N | N | N | N | N | N |
| Oil Bleed | N | N | Y | Y | N | N | N | N | N | N |
| Surface Appearance | G | G | G | G | G | G | G | G | G | G |
| Cracking (30 gram Casting) | N | N | N | N | Y | N | N | N | N | Y |

White paste:

Diisononyl phthalate
Disperplast 1142
TiO2

Inhibitor:

Propylene Carbonate
Phosphoric acid (85%)

EXAMPLE 4

Samples 22–32 were prepared and tested in accordance with the procedure of Example 1, except that the formulations in Tables 4-1 and 4-2 were used. The amounts of ingredients shown in the tables are given on a parts by weight basis.

In the tables of this example, the following terminology was used:
Y—Yes,
N—No,
G—Glossy,
F—Flat,
W—With Catalyst,
W/O—Without Catalyst→Same procedure as With Catalyst except 0.02 gram of Diotyltin Mercaptide is excluded.

Procedure for checking work life for samples 22–32: @80° F. Take 100 grams of material and add 0.02 grams of dioctyltin mercaptide. To this mixture, add 23 grams of tap water. Mix for about 1 to 2 minutes and then check for non-flow characteristics.

TABLE 4-1

| Products | 22 | 23 | 24 | 25 | 26 | 27 | 28 | 29 | 30 | 31 | 32 |
|---|---|---|---|---|---|---|---|---|---|---|---|
| Prepolymer (1) | | | | | | | | | | | |
| Lupernate MI | 24 | 24 | 24 | 24 | 24 | 24 | 24 | 24 | 24 | 24 | 24 |
| Pluracol P 2010 | 34 | 34 | 34 | 34 | 34 | 34 | 34 | 34 | 34 | 34 | 34 |
| Pluracol P 1421 | 7 | 7 | 7 | 7 | 7 | 7 | 7 | 7 | 7 | 7 | 7 |
| BHT | 0.2 | 0.2 | 0.2 | 0.2 | 0.2 | 0.2 | 0.2 | 0.2 | 0.2 | 0.2 | 0.2 |
| % NCO - checked | 10 | 10 | 10 | 10 | 10 | 10 | 10 | 10 | 10 | 10 | 10 |
| Viscosity CPS @ 80° F. | 2820 | 2820 | 2820 | 2820 | 2820 | 2820 | 2820 | 2820 | 2820 | 2820 | 2820 |
| Slurry (2) | | | | | | | | | | | |
| Diisonoyl phthalate | 22 | | | | | | | | | | |
| Di octyl Adipate | | 22 | | | | | | | | | |
| 2,2,4-trimethyl-1,3-pentanediol di isobutyrate | | | 22 | | | | | | | | |
| Di butyl Phathalate | | | | 22 | | | | | | | |
| Dibasic Ester | | | | | 22 | | | | | | |
| Propylene Carbonate | | | | | | 22 | | | | | |
| Aromatic Naptha | | | | | | | 22 | | | | |
| n-paraffinic hydrocarbon | | | | | | | | 22 | | | |
| Propylene Glycol Monomethyl Ether Acetate | | | | | | | | | 22 | | |
| Aliphatic Naptha | | | | | | | | | | 22 | |
| Petroleum Hydrocarbon (Light napthanic extract) | | | | | | | | | | | 22 |
| White Paste | 2 | 2 | 2 | 2 | 2 | 2 | 2 | 2 | 2 | 2 | 2 |
| Disperplast 1142 | 0.1 | 0.1 | 0.1 | 0.1 | 0.1 | 0.1 | 0.1 | 0.1 | 0.1 | 0.1 | 0.1 |
| Arosil R-972 | 0.3 | 0.3 | 0.3 | 0.3 | 0.3 | 0.3 | 0.3 | 0.3 | 0.3 | 0.3 | 0.3 |
| Moisture scavenger | Sufficient amount to obtain moisture content of no more than 0.02% | | | | | | | | | | |
| Magnesium oxide | 9.7 | 9.7 | 9.7 | 9.7 | 9.7 | 9.7 | 9.7 | 9.7 | 9.7 | 9.7 | 9.7 |

TABLE 4-2

| Products | 22 | | 23 | | 24 | | 25 | | 26 | | 27 | |
|---|---|---|---|---|---|---|---|---|---|---|---|---|
| Add to mixture of 1 and 2 | | | | | | | | | | | | |
| Inhibitor | 0.02 | | 0.02 | | 0.02 | | 0.02 | | 0.02 | | 0.02 | |
| Polymethylalkylsiloxane | 0.14 | | 0.14 | | 0.14 | | 0.14 | | 0.14 | | 0.14 | |
| Polyacrylate copolymer | 0.4 | | 0.4 | | 0.4 | | 0.4 | | 0.4 | | 0.4 | |
| Polymer modified poly-dimethyl-polysiloxane | 0.07 | | 0.07 | | 0.07 | | 0.07 | | 0.07 | | 0.07 | |
| Viscosity CPS @ 80° F. (after 24 Hrs) | 2200 | | 2800 | | 2300 | | 1950 | | 1670 | | 1000 | |
| 0–2 hrs heat @ 200° F., cool to 80° F. (Viscosity, CPS) | 3500 | | 2575 | | 2480 | | 2700 | | 1650 | | 1660 | |
| | W | W/o | W | W/o | W | W/o | W | W/o | W | W/o | W | W/o |
| Work life(mins) | 10 | 12 | 8 | 15 | 8 | 11 | 8 | 11 | 6 | 9 | 5 | 6 |
| Hardness - Shore A | 85 | 85 | 86 | 86 | 85 | 83 | 85 | 80 | 82 | 82 | 60 | 70 |
| Foaming Results (30 gram Casting) | N | N | N | N | N | N | N | N | N | N | Y | Y |
| Oil Bleed | N | N | N | N | N | N | N | N | N | N | N | N |
| Surface Appearance | G | G | F | F | F | F | F | F | F | F | F | F |
| Cracking (30 gram Casting) | N | N | N | N | N | N | Y | N | Y | Y | N | N |
| White paste | | | | | | | | | | | | |
| Diisononyl phthalate | 29 | | | | | | | | | | | |
| Disperplast 1142 | 1 | | | | | | | | | | | |
| TiO2 | 70 | | | | | | | | | | | |
| Inhibitor | | | | | | | | | | | | |
| Propylene Carbonate | 90 | | | | | | | | | | | |
| Phosphoric acid (85%) | 10 | | | | | | | | | | | |

| Products | 28 | | 29 | | 30 | | 31 | | 32 | |
|---|---|---|---|---|---|---|---|---|---|---|
| Add to mixture of 1 and 2 | | | | | | | | | | |
| Inhibitor | 0.02 | | 0.02 | | 0.02 | | 0.02 | | 0.02 | |
| Polymethylalkylsiloxane | 0.14 | | 0.14 | | 0.14 | | 0.14 | | 0.14 | |
| Polyacrylate copolymer | 0.4 | | 0.4 | | 0.4 | | 0.4 | | 0.4 | |
| Polymer modified poly-dimethyl-polysiloxane | 0.07 | | 0.07 | | 0.07 | | 0.07 | | 0.07 | |
| Viscosity CPS @ 80° F. (after 24 Hrs) | 990 | | 3850 | | 2250 | | 1000 | | 3300 | |
| 0–2 hrs heat @ 200° F., cool to 80° F. (Viscosity, CPS) | 8900 | | 4600 | | 1650 | | 920 | | 4600 | |
| | W | W/o | W | W/o | W | W/o | W | W/o | W | W/o |
| Work life (mins) | 8 | 14 | 2.5 | 3 | 5 | 6 | 5.5 | 7 | 7 | 9 |
| Hardness - Shore A | 87 | 85 | 82 | 80 | 87 | 85 | 90 | 87 | 88 | 88 |
| Foaming Results (30 gram Casting) | N | N | Y | N | N | N | N | N | N | N |
| Oil Bleed | N | N | N | N | N | N | N | N | N | N |
| Surface Appearance | F | F | F | F | F | F | F | F | F | F |
| Cracking (30 gram Casting) | N | N | N | N | Y | Y | Y | N | Y | N |
| White paste | | | | | | | | | | |
| Diisononyl phthalate | | | | | | | | | | |
| Disperplast 1142 | | | | | | | | | | |
| TiO2 | | | | | | | | | | |
| Inhibitor | | | | | | | | | | |
| Propylene Carbonate | | | | | | | | | | |
| Phosphoric acid (85%) | | | | | | | | | | |

EXAMPLE 5

Samples 33–36 were prepared and tested in accordance with the procedure of Example 1, except that the formulations in Tables 5-1 and 5-2 were used. The amounts of ingredients shown in the tables are given on a parts by weight basis.

In the tables of this example, the following terminology was used:
Y—Yes,
N—No,
G—Glossy,
F—Flat W—With Catalyst
W/o—Without Catalyst-->Same procedure as With Catalyst except 0.02 gram of Diotyltin Mercaptide is excluded.

Procedure for checking work life for samples 33–36: @ 80° F. Take 100 grams of material and add 0.02 grams of dioctyltin mercaptide. To this mixture, add 23 grams of tap water. Mix for about 1 to 2 minutes and then check for non-flow characteristics.

The white paste included 29.3 parts by weight of diisononyl phthalate, 0.7 parts by weight of Disperplast 1142 dispersant, and 70 parts by weight of TiO$_2$. The inhibitor included 90 parts by weight of propylene carbonate and 10 parts by weight of phosphoric acid (85%).

TABLE 5-1

| Products | 33 | 34 | 35 | 36 |
|---|---|---|---|---|
| Prepolymer (1) | | | | |
| Lupernate MS | 20 | | 24 | |
| Lupernate ISO 253 | | 20 | | 24 |
| Pluracol P 2010 | 43 | 43 | 34 | 34 |
| Pluracol P 1421 | 5 | 5 | 7 | 7 |
| BHT | 0.2 | 0.2 | 0.2 | 0.2 |
| % NCO - checked | 7.39 | 7.15 | 10.1 | 10.06 |
| Viscosity CPS @ 80° F. | 3300 | 3200 | 2300 | 2200 |
| Slurry (2) | | | | |
| Diisononyl phthalate | 22 | 22 | 22 | 22 |
| White Paste | 2 | 2 | 2 | 2 |
| Disperplast 1142 | 0.1 | 0.1 | 0.1 | 0.1 |
| Arosil R-972 | 0.3 | 0.3 | 0.3 | 0.3 |
| Moisture scavenger | Sufficient amount to obtain moisture content of no more than 0.02% | | | |
| Magnesium oxide | 6.8 | 6.8 | 9.7 | 9.7 |
| Add to mixture of 1 and 2 | | | | |
| Inhibitor | 0.02 | 0.02 | 0.02 | 0.02 |
| Polymethylalkylsiloxane | 0.14 | 0.14 | 0.14 | 0.14 |
| Polyacrylate copolymer | 0.4 | 0.4 | 0.4 | 0.4 |
| Polymer modified poly-dimethyl-polysiloxane | 0.07 | 0.07 | 0.07 | 0.07 |
| Viscosity CPS @ 80° F. (after 24 Hrs) | 5700 | 3700 | 8950 | 4400 |
| 0–2 hrs heat @ 200° F., cool to 80° F. (Viscosity, CPS) | 7450 | 5600 | 13675 | 8600 |

| | W | W/o | W | W/o | W | W/o | W | W/o |
|---|---|---|---|---|---|---|---|---|
| Work life (mins) | 2 | 3 | 3.5 | 4.5 | 1 | 1.5 | 1 | 1.5 |
| Hardness - Shore A | 63 | 62 | 64 | 62 | 78 | 78 | 80 | 80 |
| Foaming Results (30 gram Casting) | N | N | Y | N | Y | N | Y | N |
| Oil Bleed | N | N | N | N | N | N | N | N |
| Surface Appearance | G | G | F | F | F | F | F | F |
| Cracking (30 gram Casting) | Y | N | N | N | Y | N | Y | N |

EXAMPLE 6

Samples 38–39 were prepared and tested in accordance with the procedure of Example 1, except:
a. The following formulations in Tables 6-1 and 6-2 were used;
b. After combining the slurry and prepolymer admixtures, the resultant composition was not heated; and
c. The terminology of Example 3 is used.

Additionally, the white paste included 29 parts by weight diisononyl phthalate, 0.7 parts by weight Disperplast 1142 dispersant, and 70 parts by weight $TiO_2$.

The inhibitor included 90 parts by weight propylene carbonate and 10 parts by weight phosphoric acid (85%).

Procedure for checking work life for samples 38–39: @80° F. Take 100 grams of material and add 0.02 grams of dioctyltin mercaptide. To this mixture, add 23 grams of tap water. Mix for about 1 to 2 minutes and then check for non-flow characteristics.

The amounts of ingredients shown in Tables 6-1 and 6-2 are given on a parts by weight basis.

TABLE 6-1

| Products | 37 | 38 | 39 |
|---|---|---|---|
| Prepolymer (1) | | | |
| Lupernate Ml | 19.7 | 19.7 | 19.7 |
| Pluracol P 2010 | 36.43 | 36.43 | 36.43 |
| Pluracol P 1421 | 9.84 | 9.84 | 9.84 |
| n-paraffinic hydrocarbon | 6.89 | 6.89 | 6.89 |
| Di Propylene Glycol | 0.98 | 0.98 | 0.98 |
| BHT | 0 | 0 | 0 |
| % NCO - checked | 5.8 | 5.8 | 5.8 |
| Viscosity CPS @ 80° F. | 2500 | 2500 | 2500 |
| Slurry (2) | | | |
| Diisonoyl phthalate | 14.77 | 14.77 | 17.77 |
| Di octyl Adipate | 3 | 0 | 0 |
| Propylene Carbonate | 0 | 3 | 0 |
| White Paste | 1.97 | 1.97 | 1.97 |
| Disperplast 1142 | 0.1 | 0.1 | 0.1 |
| Arosil R-972 | 0.3 | 0.3 | 0.3 |
| Moisture scavenger | Sufficient amount to obtain moisture content of no more than 0.02% | | |
| Magnesium oxide | 5.41 | 5.41 | 5.41 |

TABLE 6-2

| Add to mixture of 1 and 2 | 37 | 38 | 39 |
|---|---|---|---|
| Inhibitor | 0.02 | 0.02 | 0.02 |
| Polymethylalkylsiloxane | 0.14 | 0.14 | 0.14 |
| Polyacrylate copolymer | 0.4 | 0.4 | 0.4 |
| Polymer modified poly-dimethyl-polysiloxane | 0.07 | 0.07 | 0.07 |
| Viscosity CPS @ 80° F. (after 24 Hrs) | 2500 | 2500 | 3200 |
| 0–2 hrs heat @ 200° F., cool to 80° F. (Viscosity, CPS) | 2800 | 2800 | 3800 |

| | W W/o | W W/o | W W/o |
|---|---|---|---|
| Work life (mins) | 15 | 17 | 15 |
| Hardness-Shore A (after 24 hrs) | 58 | 56 | 58 |
| Foaming Results (30 gram Casting) | N | N | N |

TABLE 6-2-continued

| Add to mixture of 1 and 2 | 37 | 38 | 39 |
|---|---|---|---|
| Oil Bleed | N | N | N |
| Surface Appearance | G | G | G |
| Cracking (30 gram Casting) | N | N | N |

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of using a water-curable composition, comprising the steps of:
   providing a water-curable composition comprising:
      an NCO-functional resin, wherein the NCO-functional resin is derived from ingredients comprising a polyisocyanate component comprising a sterically hindered isomer of MDI;
      an amount of at least one $CO_2$ scavenger effective to help reduce foaming when the composition is cured with water;
      a viscosity modifying amount of a plasticizer component, wherein the plasticizer component comprises a hydrocarbon plasticizer compound; and
   mixing the water curable composition with a curing agent comprising a substantial stoichiometric excess of water under conditions effective to internally cure the composition.

2. The method of claim 1, wherein the MDI comprises a blend of 4,4'-MDI and a sterically hindered isomer of MDI.

3. The method of claim 1, wherein the NCO-functional resin is derived from ingredients comprising:
   a polyisocyanate component; and
   a polyol component, wherein the polyisocyanate component and polyol component are present in amounts effective to provide an NCO/OH ratio that is greater than about 1.8.

4. A method of using a water-curable composition, comprising the steps of:
   providing a water-curable composition comprising:
      an NCO-functional resin;
      an amount of at least one $CO_2$ scavenger effective to help reduce foaming when the composition is cured with water;
      a viscosity stabilizing amount of a plasticizer component, wherein the plasticizer component comprises a first, relatively polar plasticizer compound and a second, relatively nonpolar plasticizer compound; and
   mixing the water curable composition with a curing agent comprising a substantial stoichiometric excess of water under conditions effective to internally cure the composition.

5. The method of claim 4, wherein the first, relatively polar plasticizer compound and the second, relatively nonpolar plasticizer compound define a Polarity Index value greater than 1.0.

6. A water-curable composition comprising:
   an NCO-functional resin;
   an amount of at least one $CO_2$ scavenger effective to help reduce foaming when the composition is cured with water;
   a viscosity stabilizing amount of a plasticizer component, wherein the plasticizer component comprises a first, relatively polar plasticizer compound and a second, relatively nonpolar plasticizer compound and wherein the plasticizer component further comprises a viscosity modifying amount of a third, hydrocarbon plasticizer compound.

7. A method of using a water-curable composition, comprising the steps of:
   providing a water-curable composition comprising:
      an NCO-functional resin having an NCO content of less than about 6.5 weight percent based upon the weight of the resin, and wherein the resin is derived from ingredients comprising a polyol component and a polyisocyanate component, the polyol component being derived from ingredients comprising:
         about 50 to 80 parts by weight of a diol per 100 parts by weight of the polyol component, wherein the diol has a molecular weight greater than about 500;
         up to about 0.1 to 10 parts by weight of a chain extender per 100 parts by weight of the polyol component;
         and about 5 to about 30 parts by weight of a polyfunctional polyol per 100 parts by weight of the polyol component;
      an amount of at least one $CO_2$ scavenger effective to help reduce foaming when the composition is cured with water; and
      a viscosity modifying amount of a plasticizer component; and
   mixing the water curable composition with a curing agent comprising a substantial stoichiometric excess of water under conditions effective to internally cure the composition.

8. The method of claim 7, wherein the NCO content is less than about 6 weight percent based upon the weight of the resin.

9. The method of claim 7, wherein the polyfunctional polyol comprises at least one triol.

10. The method of claim 7, wherein the polyfunctional polyol has a molecular weight in the range from 500 to 8000.

11. The method of claim 7, wherein the amount of the $CO_2$ scavenger is less than about 6 weight percent based upon the total weight of the water-curable composition exclusive of solvent.

12. The method of claim 1, wherein the substantial stoichiometric excess of water comprises at least 20 times the stoichiometric amount of water needed to cure the composition.

13. The method of claim 4, wherein the substantial stoichiometric excess of water comprises at least 20 times the stoichiometric amount of water needed to cure the composition.

14. The method of claim 7, wherein the substantial stoichiometric excess of water comprises at least 20 times the stoichiometric amount of water needed to cure the composition.

* * * * *